United States Patent
Holat

[11] Patent Number: 6,036,810
[45] Date of Patent: Mar. 14, 2000

[54] METHOD OF A MAKING AND APPLYING A HOLOGRAPHIC IDENTIFIER FOR GARMENTS

[76] Inventor: Barry Holat, 12135 W. Dearbourn Ave., #1, Wauwatosa, Wis. 53226

[21] Appl. No.: 08/941,470

[22] Filed: Sep. 30, 1997

Related U.S. Application Data

[62] Division of application No. 08/547,939, Oct. 25, 1995, abandoned.

[51] Int. Cl.[7] .................................................. B32B 31/00
[52] U.S. Cl. ......................... 156/248; 156/230; 156/247; 156/248; 156/268; 156/249; 427/121; 427/123
[58] Field of Search .................................. 156/152, 248, 156/249, 267, 289, 299, 324, 301, 272.2, 269, 312, 313, 305, 295, 285, 250, 268, 247, 230, 182; 427/121, 123, 96

[56] References Cited

U.S. PATENT DOCUMENTS

| | | | |
|---|---|---|---|
| 4,260,659 | 4/1981 | Gobra | 428/217 |
| 4,609,589 | 9/1986 | Hosoda et al. | 428/252 |
| 4,728,377 | 3/1988 | Gallagher | 156/58 |
| 4,766,301 | 8/1988 | Evers | 235/487 |
| 4,815,149 | 3/1989 | Erhardt et al. | 2/243 B |
| 4,838,965 | 6/1989 | Bussard | 156/83 |
| 4,906,315 | 3/1990 | McGrew | 156/231 |
| 4,956,040 | 9/1990 | Fry | 156/267 |
| 4,971,646 | 11/1990 | Schell et al. | 156/244 |
| 4,976,799 | 12/1990 | Wood | 156/106 |
| 4,981,742 | 1/1991 | Haigh | 428/64 |
| 5,073,222 | 12/1991 | Fry | 156/267 |
| 5,239,396 | 8/1993 | Thompson | 359/1 |
| 5,314,767 | 5/1994 | Bussard | 430/1 |
| 5,380,047 | 1/1995 | Molee et al. | 283/86 |
| 5,455,129 | 10/1995 | Bussard | 430/1 |
| 5,645,932 | 7/1997 | Uchibori | 428/347 |

*Primary Examiner*—Merrick Dixon
*Attorney, Agent, or Firm*—Godfrey & Kahn, S.C.

[57] ABSTRACT

An identifying tag that includes a foil sheet having first and second opposing surfaces. The foil sheet is made from a mylar polyester foil and a holographic image appears on its first surface. The second surface of the foil sheet has a layer of first heat seal adhesive applied on it. A fabric sheet having first and second surfaces and a layer of second heat seal adhesive on its first and second surfaces is bonded to the second surface of the foil sheet. The laminated sheets are die cut to predetermined size and applied to a subject garment by contacting the second surface of the fabric sheet to a surface of the garment under pressure and applying heat to the second surface of the fabric sheet.

15 Claims, 1 Drawing Sheet

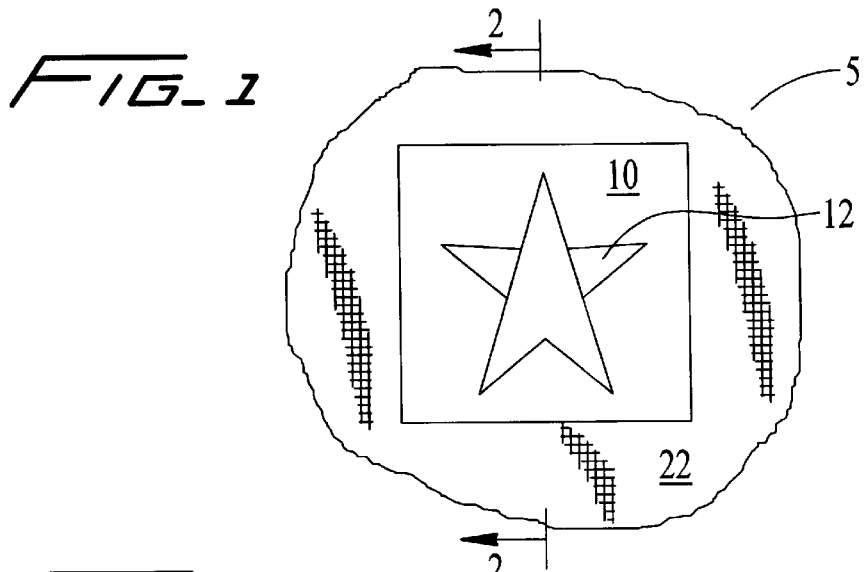
FIG_1
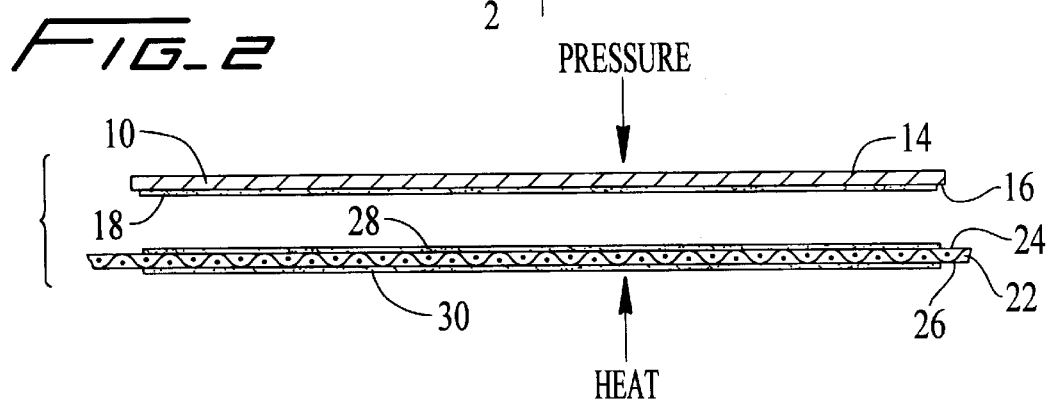
FIG_2
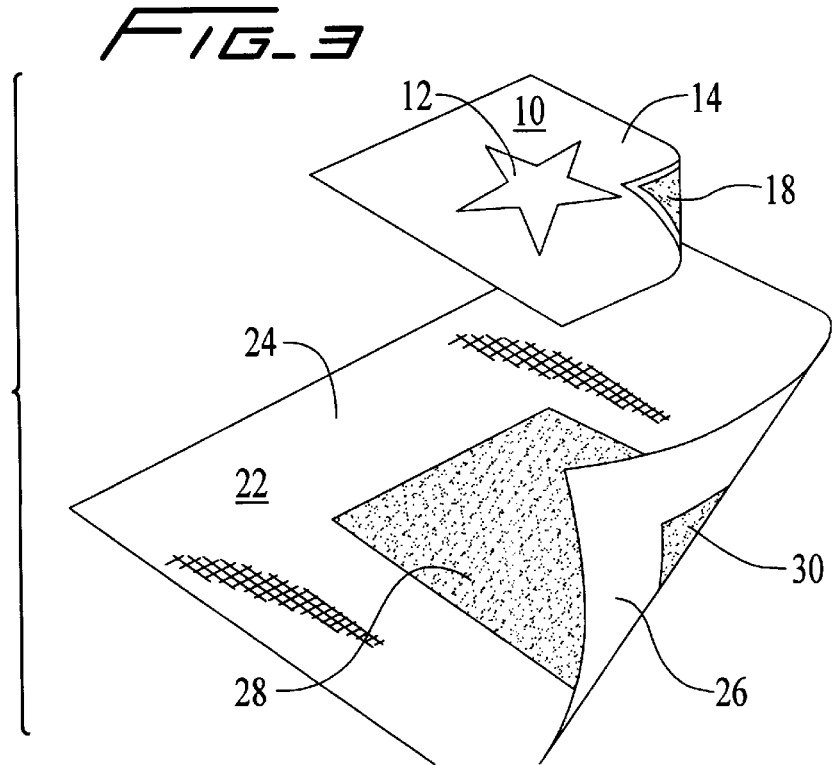
FIG_3

METHOD OF A MAKING AND APPLYING A HOLOGRAPHIC IDENTIFIER FOR GARMENTS

This application is a division of application Ser. No. 08/547,939, filed Oct. 25, 1995, now abandoned.

BACKGROUND OF THE INVENTION

1. Field of the Invention

The present invention relates to devices for identifying and verifying the authenticity of certain articles. More particularly, the present invention relates to holographic patches or tags which are applied to garments and other articles and used for identifying and verifying the authenticity of the articles. Further, the present invention relates to methods of applying the holographic tags to garments.

2. Description of the Prior Art

Holograms, negative images produced on plates using lasers, are well known. Holograms provide visually dramatic, three-dimensional images. When viewed, holograms typically present a colored image in the foreground with a detailed three-dimensional background. Holograms are printed onto a thin plastic such as Mylar® film. The film is metallized (usually aluminized) to increase its reflectivity.

Holograms have been sold as art pieces and decorations, used on magazine covers, and made a part of various products such as greeting cards and the like. Holograms have also been used as identifying and authenticating indicia on credit cards in order to deter credit fraud through copying and duplication of issued cards. The holograms, being made from plastic, are readily integrated into such plastic credit cards.

Holograms are relatively easy and inexpensive to produce and readily integrated into plastic credit cards. However, thieves and scam artists cannot readily duplicate identifying holograms from the individual credits cards they obtain. Thus, it is extremely difficult, if not impossible, to reproduce passable counterfeits of credit cards which have holograms in them. The holograms act as identifying and authenticating tags which can be visually checked by, for example, retail merchants.

While holograms have been employed in the credit card industry, their use as identifying tags has not rapidly expanded to other industries. As mentioned above, holograms have been used as decorations. They have also been used for ornamental purposes on textiles, wearing apparel, and the like and various methods have been developed for applying holograms to fabrics. One such method is disclosed in U.S. Pat. No. 4,956,040, issued to Fry. Fry discloses a method of adhering a hologram to fabric including the steps of laminating a hologram between a polyester coating and a fabric scrim in order to provide the hologram a protective envelope. The fabric scrim is designed to adhere the hologram to fabric. The resulting enveloped hologram is applied to the subject fabric under heat and pressure.

While Fry discloses a method of applying a hologram to fabric for purposes of ornamentation, Fry does not disclose the use of holograms as identifying and authenticating indicia for garments. Moreover, Fry's method is not completely satisfactory for applying holograms to fabrics and garments. As the amount of trademark licensing and product merchandising increases, there is a need to place authenticating and verifying indicia, such as holographic tags, on garments as a means of deterring copyists and counterfeiters. Also, there is a need for an improved method of applying these tags to fabrics and garments.

Accordingly, it would be desirable to have an identifying holographic tag which can be used as identifying and authenticating indicia for garments. It would also be desirable to have an improved method for applying a holographic or identifying tag to fabrics and garments.

OBJECTS AND SUMMARY OF THE INVENTION

Therefore, it is an object of the present invention to provide an improved identifying tag for use on garments.

A further object of the present invention is to provide an improved identifying tag including a hologram bonded to a fabric sheet where the identifying tag is capable of being bonded to a garment by the application of heat to the adhesive on the fabric sheet.

A further object of the present invention is to provide a method of applying a holographic tag to a garment.

These and other objects and advantages are achieved in an identifying tag that includes a foil sheet having first and second opposing surfaces. The foil sheet is made from a polyester foil, preferably a Mylar® polyester foil, and a holographic image or decoration appears on its first surface. The second surface of the foil sheet has a layer of first heat seal adhesive applied on it. Preferably, the layer of first adhesive is about 5 mils thick.

The identifying tag also includes a fabric sheet having first and second surfaces. A layer of second heat seal adhesive is applied on each of the fabric sheets surfaces. Preferably, each layer of the second heat seal adhesive is about 3 mils thick. The second surface of the foil sheet is bonded to the first surface of the fabric sheet, and the identifying tag is capable of being bonded to a garment by the application of heat to the layer of second heat seal adhesive on the second surface of the fabric sheet.

The identifying tag is applied to a subject garment by a novel method including the steps of applying a layer of first heat seal adhesive to a first surface of a foil sheet. The first adhesive may be an adhesive tape and may be applied to the foil sheet in a roll laminator at a temperature of about 250° F. A second heat seal adhesive is then applied to each first and second opposing surfaces of a fabric sheet. The second adhesive may be applied using a heat transfer press. While the second adhesive is still tacky the first surface of the foil sheet is brought into contact with the first surface of the fabric sheet, laminating the two sheets together. Once the sheets are laminated they are die-cut to a predetermined size. The die-cut, laminated foil and fabric sheets are applied to a garment by contacting the second surface of the fabric sheet to a surface of the garment under pressure and applying heat to the second surface of the fabric sheet.

Further objects and advantages of the present invention will become more apparent from the following detailed description of the preferred embodiments taken in combination with the accompanying drawings.

BRIEF DESCRIPTION OF THE DRAWINGS

FIG. 1 is a top, perspective view of an identifying tag of the present invention showing the foil and fabric sheets prior to die-cutting.

FIG. 2 is an enlarged, exploded, schematic, cross-sectional view of the identifying tag of FIG. 1 taken along the line 2—2 of that figure and shows the layered construction of the identifying tag.

FIG. 3 is a side, exploded, perspective view of the identifying tag of FIG. 1 shown with the corners of the foil and fabric sheets turned up.

DESCRIPTION OF THE PREFERRED EMBODIMENTS

Referring more particularly to the drawings, an identifying tag 5 is shown in perspective in FIG. 1. The identifying tag includes a foil sheet 10 which has a holographic image 12 printed thereon, a first surface 14, and a second surface 16 (FIG. 2). Preferably, the foil sheet 10 is made from a Mylar® polyester foil. Such foil sheets are known in the art. Applied to the second surface 16 is a layer of first heat seal adhesive 18. Preferably, the layer of first heat seal adhesive 18 is about 5 thousands of an inch or 5 mils thick and applied at a temperature from about 225° F. to about 250° F. and preferably at about 250° F. The adhesive may be applied to the foil sheet 10 using roll laminators known in the art. An adhesive suitable for use as the first heat seal adhesive is available from Bemis Associates, Inc., Shirley, Mass., under the product number 5251.

A fabric sheet 22 having a first surface 24 and a second surface 26 is bonded to the second surface 16 of the foil sheet 10. A first layer 28 of a second heat seal adhesive is applied to the first surface 24 of the fabric sheet 22. A second layer 30 of the second heat seal adhesive is applied to the second surface 26 of the fabric sheet 22. Preferably, each layer of second heat seal adhesive is about 3 mils thick and applied at a temperature from about 300° to about 330° F. and preferably at about 330° F. Unsatisfactory results are obtained when the second heat seal adhesive is applied at temperatures greater than about 330° F. The second heat seal adhesive may be applied using a heat transfer press. The press should be operated so that a pressure of about 45 to about 55 pounds per square inch is applied for a period of about 8 to about 10 seconds. Preferably, the pressure is about 50 pounds per square inch. An adhesive suitable for use as the second heat seal adhesive is available from Bemis Associates, Inc., under the product number 5250.

In another embodiment useful when the identifying tag 5 is sewn to a garment of interest, no layer of adhesive is applied to the second surface 26 of the fabric sheet 22.

The foil sheet 10 and fabric sheet 22 are bonded together by bringing the two sheets into contact with one another while the two layers of second heat seal adhesive are still tacky and warm from being applied to the fabric sheet 22. Once the foil sheet 10 is in a desired position, the laminated sheets are die cut using known equipment to a desired size.

The die-cut, laminated foil and fabric sheets 10 and 22 make up a holographic patch or tag, i.e., the identifying tag 5, and may be applied to garments and other wearing apparel. The identifying tag 5 is applied to a garment of interest under pressure and heat using known heat transfer presses. The identifying tag 5 and garment are placed within the heat transfer press so that heat is applied to the second layer of adhesive 30 on the second surface 26 of the fabric sheet 22. The image 12 tends to be damaged if heat is applied to the other exposed surface of the identifying tag 5, namely the first surface 14 of the foil sheet 10.

In the present invention heat is directed to the adhesive through the garment and passes up to the fabric sheet 22. This method of applying the identifying tags to the garment is directly opposite of standard methods used to apply iron-on patches and the like, where heat is directed through the top of the patch through a layer of adhesive and down to the underlying garment of interest.

The heat is applied at a temperature of about 330° F. and the garment and identifying tag are held under a pressure of about 50 pounds per square inch for about 8 to about 10 seconds. Preferably, pressure and heat are applied for about 8 seconds, as it has been found that the holographic image on presently available foil sheets will be damaged if the period of time is greater than about 10 seconds.

Once in place, the identifying tag may be used by retailers and customers alike to verify the authenticity of the products they purchase. Manufactures may select one or more authenticating images to be used on tags for garments and the like. Those garments lacking the tag or having copied tags which are not holographs may then be easily identified as counterfeits. Thus, the present invention provides a holographic identifier for use on garments and similar items. Further described herein is a novel method of making the identifier and applying it to such items.

While the present invention has been described in what is believed to be the most preferred form, it is to be understood that the invention is not confined to the particular construction and arrangement of the components, methods, and processes herein illustrated and described, but embraces such modified forms thereof as come within the scope of the following claims.

What is claimed is:

1. A method of making a holographic tag for use on garments, the method comprising the steps of:
    applying a layer of first heat seal adhesive to a first surface of a holographic foil sheet;
    applying a layer of second heat seal adhesive to each first and second opposing surface of a fabric sheet; and
    laminating the first surface of the holographic foil sheet to the first surface of the fabric sheet by bringing the holographic foil sheet and fabric sheet into contact with one another.

2. A method as claimed in claim 1, wherein the first heat seal adhesive is about 5 mils thick and is applied at a temperature of about 250° F.

3. A method as claimed in claim 2, wherein the second heat seal adhesive is about 3 millimeters thick and is applied at a temperature of about 330° F. and at a pressure of about 50 pounds per square inch.

4. A method as claimed in claim 1, wherein the second heat seal adhesive is about 3 millimeters thick and is applied at a temperature of about 330° F. and at a pressure of about 50 pounds per square inch.

5. A method as claimed in claim 1, further comprising the step of die-cutting the laminated holographic foil and fabric sheets to a predetermined size.

6. A method of making a holographic tag for use on garments, the method comprising the steps of:
    applying a layer of first heat seal adhesive to a first surface of a holographic foil sheet;
    applying a layer of second heat seal adhesive to each first and second opposing surfaces of a first fabric sheet;
    laminating the first surface of the holographic foil sheet to a first surface of the fabric sheet by bringing the holographic foil sheet and fabric sheet into contact with one another;
    die-cutting the laminated holographic foil and fabric sheets to a predetermined size; and
    applying the die-cut, laminated holographic foil and fabric sheets to a garment by contacting the second surface of the fabric sheet to a surface of the garment and applying heat to the layer of second heat seal adhesive on the second surface of the fabric sheet by directing heat through the garment to the layer of second heat seal adhesive on the second surface of the fabric sheet.

7. A method of making a holographic tag for use on garments, the method comprising the steps of:

applying a layer of first heat seal adhesive to a first surface of a holographic foil sheet;

applying a layer of second heat seal adhesive to each first and second opposing surface of a fabric sheet;

laminating the first surface of the holographic foil sheet to a first surface of the fabric sheet by bringing the holographic foil sheet and fabric sheet into contact with one another;

die-cutting the laminated holographic foil and fabric sheets to a predetermined size;

applying the die-cut, laminated holographic foil and fabric sheets to a garment by contacting the second surface of the fabric sheet to a surface of the garment and applying heat to the layer of second heat seal adhesive on the second surface of the fabric sheet by directing heat through the garment to the layer of second heat seal adhesive on the second surface of the fabric sheet; and wherein the die-cut laminated holographic foil and fabric sheets are applied to the garment at a temperature of about 330° F., under a pressure of about 50 pounds per square inch for a period of about 8 seconds.

8. A method of applying a holographic tag to a garment, the method comprising the steps of:

applying a layer of first heat seal adhesive to a first surface of a holographic foil sheet, the first heat seal adhesive being applied at a temperature of about 250° F.;

applying a layer of second heat seal adhesive to each first and second opposing surface of a fabric sheet, each layer being applied at a temperature of about 330° F. and at a pressure of about 50 pounds per square inch, the pressure and temperature maintained for a period of about 10 seconds;

laminating the first surface of the holographic foil sheet to the first surface of the fabric sheet by bringing the holographic foil sheet and fabric sheet into contact with one another;

die-cutting the laminated holographic foil and fabric sheets to a predetermined size; and applying the die-cut, laminated holographic foil and fabric sheets to the garment by contacting the second surface of the fabric sheet to a surface of the garment under heat and pressure for a period of about 8 seconds, where the heat is applied to the second surface of the fabric sheet at a temperature of about 330° F. and the pressure is about 50 pounds per square inch.

9. A method of making a holographic tag for use on garments, the method comprising the steps of:

applying a layer of heat seal adhesive to a first surface of a holographic foil sheet, the holographic foil sheet having a second surface;

laminating the first surface of the holographic foil sheet to the first surface of a substrate by bringing the first surface of the holographic foil sheet into contact with the first surface of the substrate and applying pressure to the second surface of the holographic foil sheet and heat to the second surface of the substrate;

die cutting the laminated holographic foil sheet and substrate into one or more pieces;

affixing at least one of the die-cut pieces to an article of interest.

10. A method as in claim 9, further comprising the step of applying a layer of heat seal adhesive to each first and second opposing surfaces of the substrate before laminating the holographic foil sheet and substrate.

11. A method as in claim 10, wherein the at least one die cut piece is affixed to an article of interest by means of the adhesive on the second surface of the substrate.

12. A method as in claim 9, wherein the at least one die cut piece is affixed to an article of interest by sewing it in place.

13. A method as in claim 9, wherein the article of interest is a garment.

14. A method as in claim 9, wherein the article of interest is a shoe.

15. A method as in claim 9, wherein the substrate is a fabric sheet.

\* \* \* \* \*